United States Patent [19]
Ellingham

[11] 3,875,732
[45] Apr. 8, 1975

[54] TEXTILE MACHINES
[75] Inventor: Bruce Ellingham, Nelson, England
[73] Assignee: Platt International Limited, Helmshore, Rossendale, Lancashire, England
[22] Filed: Mar. 14, 1974
[21] Appl. No.: 451,250

[30] Foreign Application Priority Data
Mar. 14, 1973 United Kingdom............ 12189/73

[52] U.S. Cl. .............................................. 57/58.89
[51] Int. Cl........................... D01h 7/00; F16c 17/16
[58] Field of Search............. 57/34 R, 58.89, 58.95, 57/100, 179, 130, 133; 308/162, 228

[56] References Cited
UNITED STATES PATENTS

| | | | |
|---|---|---|---|
| 2,842,933 | 7/1958 | Pujol................. | 57/58.89 |
| 3,126,697 | 3/1964 | Cizek et al........... | 57/58.89 |
| 3,481,129 | 12/1969 | Shepherd et al....... | 57/58.89 |
| 3,481,130 | 12/1969 | Kubovy et al........ | 57/58.89 |
| 3,543,500 | 12/1970 | Bancroft et al....... | 57/58.89 |
| 3,599,414 | 8/1971 | Polyakovsky et al..... | 57/58.89 |
| 3,769,785 | 11/1973 | Schiltknecht......... | 57/58.89 |

Primary Examiner—Donald E. Watkins
Attorney, Agent, or Firm—Watson, Cole, Grindle & Watson

[57] ABSTRACT

An open end spinning unit including a shaft which is rotatably supported in two gas bearings arranged in spaced relation therealong, a spinning rotor carried on one end of the shaft and rotatable therewith, and a thrust bearing arrangement for limiting axial movement of the shaft, said thrust bearing arrangement being situated between the two gas bearings and comprising a first thrust element which is so fixed to the shaft that it is rotatable therewith and which presents a first thrust surface and a second thrust element presenting a second thrust surface in opposition to, and for cooperation with, the first thrust surface, and the arrangement being such that in operation a gap is maintained between the surfaces by the generation of a film of pressurised gas therebetween.

21 Claims, 4 Drawing Figures ated between the two gas bearings and comprising a
TEXTILE MACHINES The present invention relates to open end spinning units.

According to the present invention, there is provided an open end spinning unit including a shaft which is rotatably supported in two gas bearings arranged in spaced relation therealong, a spinning rotor carried on one end of the shaft and rotatable therewith, and a thrust bearing arrangement for limiting axial movement of the shaft, said thrust bearing arrangement being situated between the two gas bearings and comprising a first thrust element which is so fixed to the shaft that it is rotatable therewith and which presents a first thrust surface, and a second thrust element presenting a second thrust surface in opposition to and for cooperation with the first thrust surface, and the arrangement being such that, in operation, a gap is maintained between the thrust surfaces by the generation of a film of pressurised gas therebetween.

Preferably, the shaft is arranged to be rotated by an electric motor, the rotor of which is mounted on the shaft between the gas bearings and the thrust bearing arrangement is situated between the motor rotor and one or other of the gas bearings.

The thrust bearing arrangement is preferably situated between the motor and that gas bearing which is adjacent the spinning rotor.

One or other of the first and second thrust surfaces may be provided with spiral grooves for generating a film of pressurised air in the gap between the thrust surfaces and, or in the alternative, there may be means for supplying pressurised air to the gap between the thrust surfaces. Thus, during start-up pressurised air may be supplied between the surfaces to provide a film of pressurised air separating the surfaces and when normal spinning or piecing-up speed has been reached, the supply of pressurised air may be discontinued whereby the film of pressurised air is provided solely by the effect of the spiral grooves in the said one or other of the thrust surfaces. If desired the supply of pressurised air may be continued throughout operation of the unit. The film of air opposes axial movement of the shaft tending to close the gap.

Preferably, the spinning unit is provided in a housing the interior of which may be pressurised either by the continuous escape of pressurised air from the gap between the thrust surfaces and/or the continuous supply of pressurised air into the interior of the housing. The pressurisation of the interior of the housing provides a thrust on the face of the first thrust element opposite to that face presenting the first thrust surface, which thrust is operative to oppose axial movement of the shaft in a direction tending to open the gap whereby the thrust bearing is capable of limiting axial movement of the shaft in both directions.

Some embodiments of the invention will now be described by way of example only with reference to the accompanying drawings, in which.

Figure 1:
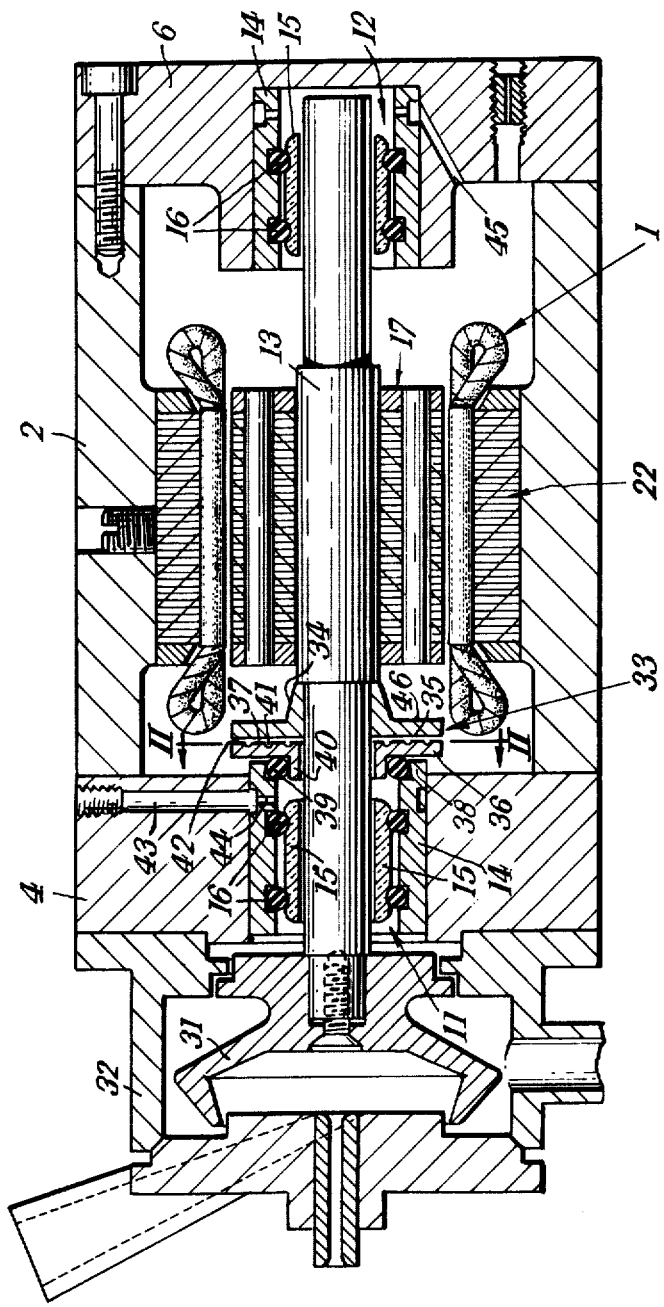
FIG. 1 is a cross-sectional side elevation of an open end spinning unit according to a first embodiment of the invention.

Referring firstly to FIG. 1, the open end spinning unit shown includes an electric induction motor 1 mounted in a cylindrical casing 2, provided with a front cover plate 4 = supporting centrally thereof a first air bearing 11, and a rear cover plate 6 supporting centrally thereof a second air bearing 12. A steel shaft 13 is supported in the air bearings 11 and 12 and a spinning rotor 31 is carried on that end of shaft 13 which extends through the air bearing 11 in the front cover plate 4. The spinning rotor 31 is positioned within a spinning chamber 32. The central region of the shaft 13 carries an electrical motor rotor 17, the motor stator 22 being arranged around the rotor 17 and secured to the inner wall of the casing 2. Each bearing assembly 11 and 12 comprises a grooved sleeve 14 in which a journal bearing element 15, which may be of glass or a plastics material, is resiliently mounted in two O ring 16.

The shaft 13 is also provided with a thrust bearing 33 at a position between the motor rotor 17 and the first air bearing 11 in the front cover plate 4. The thrust bearing 33 comprises a thrust plate 34 carried on the shaft 13 for the inner therewith and presenting a first thrust surface 35, and a stationary thrust annulus 36 which presents a second thrust surface 37 adjacent to and for co-operation with the first thrust surface 35. The grooved sleeve 14 of the first air bearing 11 has an annular extension 38 the internal surface of which tapers inwardly to form a seating for a resilient O ring 39. The thrust annulus 36 has a spigot 40 which is resiliently mounted by insertion through the opening of the O ring 39.

The thrust annulus 36 has spiral grooves 41 provided in its thrust surface 37 and in operation of the spinning unit, rotation of the thrust plate 34 causes the spiral grooves to provide a pumping action which generates a film of air between the thrust surfaces 35 and 37. The film of air acts to maintain the thrust surfaces 35 and 37 separated by small clearance gap 42 and also opposes axial movement of the shaft 13 in a direction tending to close the gap 42.

In operation, pressurised air is supplied through the air inlet 43 formed in the front cover plate 4 and passes through a passage 44 formed in the sleeve 14, through the clearance formed between the shaft 13 and the thrust annulus 36 and then radially outwardly through the gap 42 between thrust surfaces 35 and 37, thus causing pressurisation of the interior of the casing 2. The pressurised air passes through the gap between the motor rotor and stator 22 and then through a passage 45 extending through the rear cover plate 6 and the journal bearing element 15. This passage 45 is so angled as to be directed towards the end of shaft 13. Thus a thrust is provided on the opposite face 46 of the thrust plate 34 to that presenting the thrust surface 35 and together with the air acting on the end face of the shaft 13 opposes axial movement of the shaft in a direction tending to increase the size of the air gap between the thrust surfaces 35 and 37. Thus the bearing 33 opposes axial movement of the shaft 13 in both directions.

When the motor is energised the shaft 13 is caused to rotate thereby inducing air pressure in the clearance gaps between the shaft 13 and the bearing elements 15.

In order to maintain the correct air pressure conditions within the casing 2 an air vent 47 is provided in the rear cover plate 6 to allow air to pass to the atmosphere.

Figure 2:
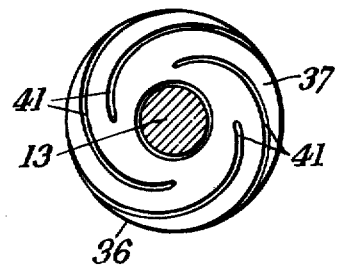
FIG. 2 is a cross-sectional end elevation of part of the unit shown in FIG. 1, taken on the line II—II in FIG. 1.

As can be seen in FIG. 2, the thrust annulus 36 has logarithmic spiral grooves provided in its thrust surface 37 and in operation of the spinning unit, rotation of the thrust plate 34 causes the spiral grooves to provide a pumping action which generates a film of air between thrust surfaces 35 and 37.

Figure 3:
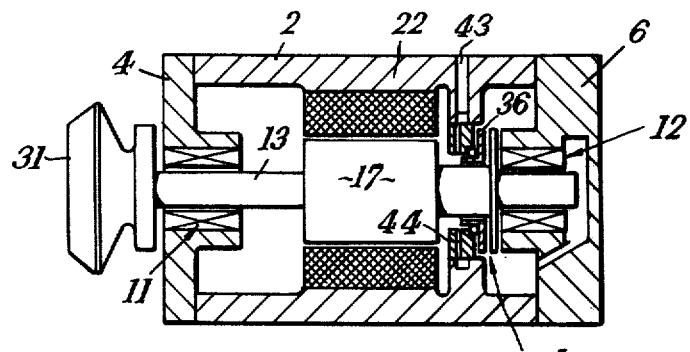
FIG. 3 is a cross-sectional side elevation of an open end spinning unit according to a second embodiment of the invention.

In a second embodiment of the invention shown in FIG. 3, those parts of the spinning unit which are the same as those in the embodiment described with reference to FIG. 1 have been indicated by like reference numerals. In the open end spinning unit shown in FIG. 3 a thrust bearing 33' corresponding to the thrust bearing 33 in FIG. 1 is situated between the motor rotor 17 and the second air bearing 12 in the rear cover plate 6. Operation of the unit illustrated in FIG. 3 is essentially the same as that of the unit illustrated in FIG. 1.

In the above described embodiment of the invention the aerodynamic bearing assemblies 11 and 12 may be replaced by aerostatic bearings where compressed air is supplied to the gap between the shaft 13 and the journal bearing element 15.

The interior of the housing of the units may also be pressured by continuously supplying compressed air to the interior of the housing to provide thrust on the reverse face of the thrust plate of the thrust bearing.

Figure 4:
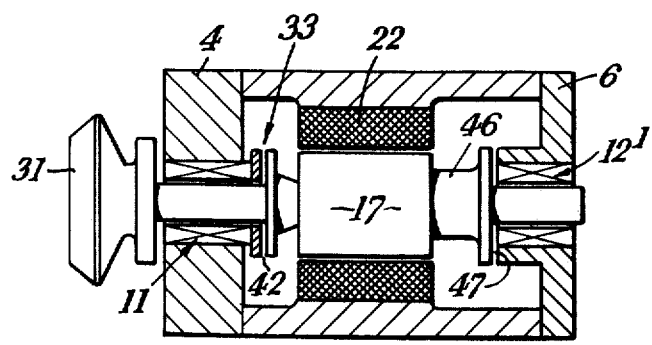
FIG. 4 is a modification of the open end spinning unit shown in FIG. 1.

FIG. 4 shows a further embodiment of a spinning unit according to the invention and again those parts of the spinning unit which are the same as those in the embodiment described with reference to FIG. 1 have been indicated by like reference numerals.

Referring now to FIG. 4, it will be seen that the thrust bearing 33 is situated between the motor rotor 17 and the aerodynamic air bearing 11, and that the shaft 13 is provided with a stepped portion 46 defining an annular thrust face 47 adjacent an aerostatic air bearing 12'. In operation, air escaping inwardly into the casing 2 from the air bearing 12' acts on the thrust face 47 to provide a thrust which acts to oppose axial movement of the shaft 13 in a direction tending to increase the gap 42 between the thrust surfaces 35 and 37 of the thrust bearing 33.

It will, of course, be appreciated that when the thrust bearing 33 is arranged between the motor rotor 17 and the bearing 12, the shaft 13 may be provided with a stepped portion corresponding to the stepped portion 46 and presenting a thrust face adjacent an aerostatic bearing.

What I claim as my invention and desire to secure by Letters Patent is:

1. An open end spinning unit including a shaft which is rotatably supported in two gas bearings arranged in spaced relation therealong, a spinning rotor carried on one end of the shaft and rotatable therewith, and a thrust bearing arrangement for limiting axial movement of the shaft, said thrust bearing arrangement being situated between the two gas bearings and comprising a first thrust element which is so fixed to the shaft that it is rotatable therewith and which presents a first thrust surface and a second thrust surface presenting a second thrust surface in opposition to, and for co-operation with, the first thrust surface, and the arrangement being such that in operation a gap is maintained between the surfaces by the generation of a film of pressurised gas therebetween.

2. A unit according to claim 1, wherein the shaft is arranged to be rotated by an electric motor, the rotor of which is fixedly mounted on the shaft between the gas bearings.

3. A unit according to claim 2, wherein the thrust bearing is situated between the motor rotor and one of the gas bearings.

4. A unit according to claim 3, wherein the thrust bearing is situated between the motor rotor and the gas bearing adjacent the spinning rotor.

5. A unit according to claim 3, wherein said thrust bearing is situated between the motor rotor and the gas bearing remote from the spinning rotor.

6. A unit according to claim 3, including pressurised air supply means for supplying pressurised air to the gap between the said first and second thrust surfaces.

7. A unit according to claim 6, including a housing for housing the thrust bearing and so supplied with pressurised air as to exert thrust on the thrust bearing arrangement such as to oppose axial movement of the shaft in a direction to open the gap between said first and second thrust surfaces.

8. A unit according to claim 7, wherein the housing is arranged to be supplied with pressurised air by the escape of pressurised air from the gap between the first and second thrust surfaces.

9. A unit according to claim 7 wherein the housing is arranged to be supplied with pressurised air from an external supply of pressurised air.

10. A unit according to claim 7 wherein the said housing houses the two gas bearings.

11. A unit according to claim 10, wherein the end of the shaft remote from the spinning rotor terminates within the housing and wherein the pressurised air supplied to the interior of the housing is so directed to the last-mentioned end of the shaft as further to provide a thrust on the shaft opposing the opening of the gap between the first and second thrust surfaces.

12. A unit according to claim 10 wherein the housing houses the electric motor, the stator of which is stationarily mounted within the housing.

13. A unit according to claim 7 wherein said housing is formed by a cylindrical casing open at each end, a first cover plate closing one end of the casing and housing one of the gas bearings and a second cover plate closing the other end of the casing and a second cover plate closing the other end of the casing and housing the other of the gas bearings.

14. A unit according to claim 1 wherein the second thrust element of the thrust bearing arrangement is stationarily arranged.

15. A unit according to claim 1 wherein one of the first and second thrust elements is formed in the thrust surface thereof with a spiral groove or grooves so arranged as in operation to generate said film of pressurised air therebetween.

16. A unit according to claim 15, wherein said second thrust element is formed with said spiral groove or grooves.

17. A unit according to claim 1 wherein said second thrust element is resiliently mounted.

18. A unit according to claim 1 wherein said gas bearings are aerodynamic gas bearings.

19. A unit according to claim 1 wherein a further thrust bearing arrangement is situated on the side of the motor rotor opposite that on which the first-mentioned thrust bearing arrangement is situated and between the motor rotor and the other gas bearing.

20. A unit according to claim 19, wherein the further thrust bearing arrangement comprises a first thrust element which is so fixed to the shaft that it is rotatable therewith and which presents a first thrust surface and a second thrust element presenting a second thrust surface in opposition to and for cooperation with the first thrust surface, and wherein the arrangement is such that in operation a gap is maintained between the thrust surfaces of the further thrust bearing arrangement by the generation of a film of pressurised gas therebetween.

21. A unit according to claim 20, wherein the film of pressurised gas between the thrust surfaces of the further thrust bearing arrangement is generated by air from the adjacent gas bearing.

* * * * *